US011673443B2

(12) United States Patent
Desourdy et al.

(10) Patent No.: US 11,673,443 B2
(45) Date of Patent: Jun. 13, 2023

(54) SUSPENSION SYSTEM FOR ELECTRIC HEAVY-DUTY VEHICLE

(71) Applicant: LES MOTEURS NORDRESA INC., Laval (CA)

(72) Inventors: Guillaume Desourdy, Terrebonne (CA); Jason Soares, Montreal (CA)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 253 days.

(21) Appl. No.: 16/943,943

(22) Filed: Jul. 30, 2020

(65) Prior Publication Data

US 2022/0032704 A1    Feb. 3, 2022

(51) Int. Cl.
*B60G 7/00* (2006.01)
*B60G 11/27* (2006.01)
(Continued)

(52) U.S. Cl.
CPC .............. *B60G 11/27* (2013.01); *B60G 7/008* (2013.01); *B60G 7/02* (2013.01); *B60G 17/052* (2013.01); *B60G 2202/152* (2013.01); *B60G 2204/126* (2013.01); *B60G 2204/143* (2013.01); *B60G 2204/148* (2013.01); *B60G 2300/026* (2013.01); *B60G 2300/50* (2013.01);
(Continued)

(58) Field of Classification Search
CPC .......... B60G 11/27; B60G 7/008; B60G 7/02; B60G 17/052; B60G 2202/152; B60G 2204/126; B60G 2204/143; B60G 2204/148; B60G 2300/026; B60G 2300/50; B60G 2400/05162; B60G 2500/30; B60G 2800/914; B60G 2204/129
See application file for complete search history.

(56) References Cited

U.S. PATENT DOCUMENTS 2,789,234 A    4/1957    Lambert et al.
3,189,118 A *  6/1965    Arning ................... B60G 3/20
                                                267/221
(Continued)

FOREIGN PATENT DOCUMENTS

DE    4217260 A1    12/1993
DE    10144111 A1    3/2003
(Continued)

OTHER PUBLICATIONS

"Car Suspensions," ESF Stream Engineering Lab Website, Available Online at https://esfstream.com/update-atrc-truck/car-suspensions/, Available as Early as Jan. 2019, 2 pages.

*Primary Examiner* — James A English
*Assistant Examiner* — Matthew James O'Neill
(74) *Attorney, Agent, or Firm* — McCoy Russell LLP

(57) ABSTRACT

Methods and systems are provided for an electric heavy-duty vehicle. In one example, a system for the vehicle may include a wheel hub assembly coupled to a frame of the vehicle via a first wishbone arm and a second wishbone arm, and an air spring coupled at opposite ends to a first link and a second link, each of the first link and the second link being pivotably coupled to the frame of the vehicle, the second link further being pivotably coupled to the first wishbone arm. The air spring may be positioned above the wheel hub assembly with respect to the vehicle.

19 Claims, 9 Drawing Sheets

(51) Int. Cl.
  *B60G 17/052*    (2006.01)
  *B60G 7/02*      (2006.01)
(52) U.S. Cl.
  CPC .............. *B60G 2400/05162* (2013.01); *B60G 2500/30* (2013.01); *B60G 2800/914* (2013.01)

(56) References Cited

U.S. PATENT DOCUMENTS

| | | | |
|---|---|---|---|
| 4,555,096 | A | 11/1985 | Pryor |
| 6,612,394 | B2 | 9/2003 | Wessman |
| 6,722,459 | B1 | 4/2004 | Wendl et al. |
| 6,808,191 | B1 | 10/2004 | Buhl et al. |
| 6,932,148 | B1 | 8/2005 | Brummett et al. |
| 7,338,335 | B1 * | 3/2008 | Messano ............ B60H 1/00428 903/903 |
| 8,205,896 | B2 | 6/2012 | Gell et al. |
| 8,915,507 | B2 | 12/2014 | Helm |
| 9,352,781 | B2 | 5/2016 | Scheper et al. |
| 9,937,781 | B1 | 4/2018 | Bryer et al. |
| 11,220,150 | B2 * | 1/2022 | Laforce ................. B60G 11/04 |
| 11,285,795 | B2 * | 3/2022 | Hill ........................ B60L 50/62 |
| 2004/0169374 | A1 | 9/2004 | Wurtele et al. |
| 2014/0210174 | A1 * | 7/2014 | Conaway ............... B60G 11/28 280/86.5 |
| 2015/0191070 | A1 | 7/2015 | Raymond |
| 2017/0106904 | A1 | 4/2017 | Hanson et al. |
| 2018/0170136 | A1 | 6/2018 | Gell et al. |
| 2019/0047346 | A1 * | 2/2019 | Carpenter .......... B60G 17/0155 |
| 2019/0291556 | A1 | 9/2019 | Caliskan et al. |

FOREIGN PATENT DOCUMENTS

| | | | | |
|---|---|---|---|---|
| DE | 102007047791 A1 * | 5/2009 | ............. | B60G 11/27 |
| DE | 102011005618 A1 | 9/2012 | | |
| DE | 202014101670 U1 | 7/2014 | | |
| DE | 102016207111 A1 | 11/2017 | | |
| DE | 102016223374 A1 | 5/2018 | | |
| DE | 102018206407 B4 * | 6/2020 | .......... | B60K 17/046 |
| EP | 1213162 A1 | 6/2002 | | |
| EP | 1231083 A2 | 8/2002 | | |
| EP | 2207690 B1 | 2/2013 | | |
| EP | 2780182 A1 | 9/2014 | | |
| EP | 2946991 B1 | 11/2016 | | |
| EP | 3246190 A1 * | 11/2017 | | |
| WO | 9840235 A1 | 9/1998 | | |
| WO | 2009062823 A1 | 5/2009 | | |

* cited by examiner

SUSPENSION SYSTEM FOR ELECTRIC HEAVY-DUTY VEHICLE

FIELD

The present description relates generally to suspension systems for an electric heavy-duty vehicle.

BACKGROUND AND SUMMARY

An internal combustion engine heavy-duty vehicle may be configured with rear-wheel drive to enhance initial acceleration and increase traction. Increasing interest in reducing fossil fuel combustion has led to efforts to provide electric heavy-duty vehicles. In order to electrically propel such vehicles, a large battery pack may be demanded. The battery pack may be positioned low in the vehicle, such as along a chassis of the vehicle, and may have a large footprint, resulting in packaging constraints along an underside of the vehicle. Furthermore, a low vertical positioning of a floor of the vehicle, and hence the chassis and the battery pack, may be desirable in heavy-duty vehicles to enable efficient loading and unloading thereof.

The large size of the battery pack and low floor of the vehicle may demand modifications to various vehicle components and systems. For example, the vehicle may be configured with front-wheel drive instead of rear-wheel drive as a result of the space between the rear wheels being occupied by the vehicle floor. The lack of packaging space between the rear wheels may also demand adjustments to a suspension system at the vehicle rear wheels. In addition, modification of a suspension system at the vehicle's front wheels may be desired to accommodate motorization of the front wheels.

In one example, the issues described above may be addressed by a system for a vehicle, the system including a wheel hub assembly coupled to a frame of the vehicle via a first wishbone arm and a second wishbone arm, and an air spring coupled at opposite ends to a first link and a second link, each of the first link and the second link being pivotably coupled to the frame of the vehicle, the second link further being pivotably coupled to the first wishbone arm, wherein the air spring may be positioned above the wheel hub assembly with respect to the vehicle. In this way, an air suspension system may be provided for a low-floor heavy-duty vehicle by positioning the air spring so as to not interfere with drive shafts of the wheel hub assembly and to provide increased lowering of a cabin floor of the vehicle.

In some examples, the vehicle may be provided with air springs above both front wheel hub assemblies and rear wheel hub assemblies, wherein a configuration of the air springs at the front wheel hub assemblies may be different from a configuration of the air springs at the rear wheel hub assemblies. For example, at the front wheel hub assemblies, the second link may be a leveling link, provided to maintain substantially axial compression of the air spring between a maximally expanded position and a maximally compressed position. Further, at the rear wheel hub assemblies, the air springs may be fixedly coupled to a single rear axle, the single rear axle being coupled to rear trailer wheels. In this way, the air spring may not utilize any axially guiding structure extending a length thereof, allowing for ease of manufacture and maintenance by reducing a total number of obstructing or specialized components (e.g., guiding structures, uniquely configured air springs, etc.) at the front and rear wheel hub assemblies. Accordingly, the air suspension system may be adapted to the low-floor heavy-duty vehicle as configured for front-wheel drive.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-9 are shown approximately to scale.

DETAILED DESCRIPTION

Figure 1:
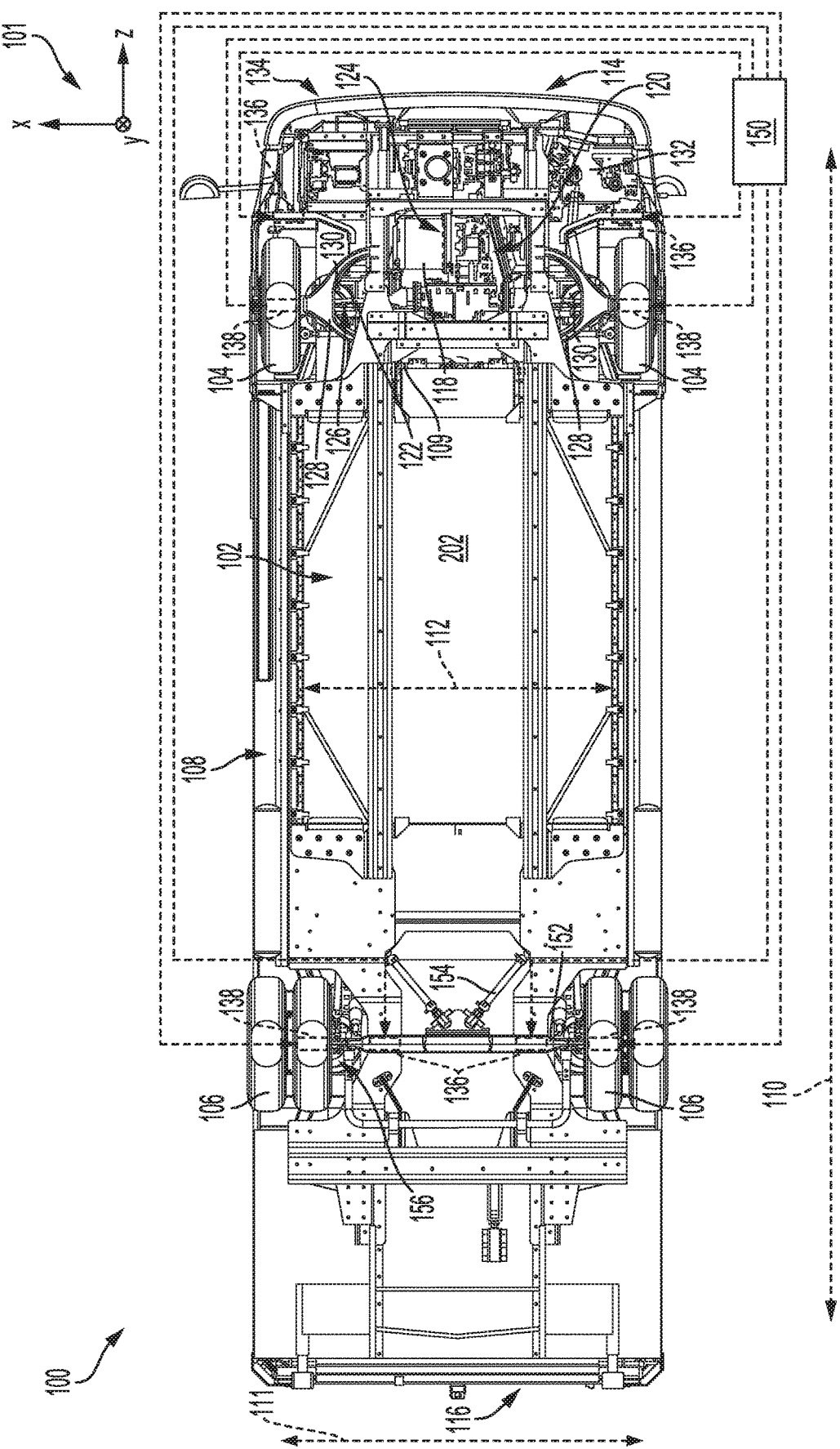
FIG. 1 shows a bottom view of an example of a vehicle with a low floor.
Figure 2:
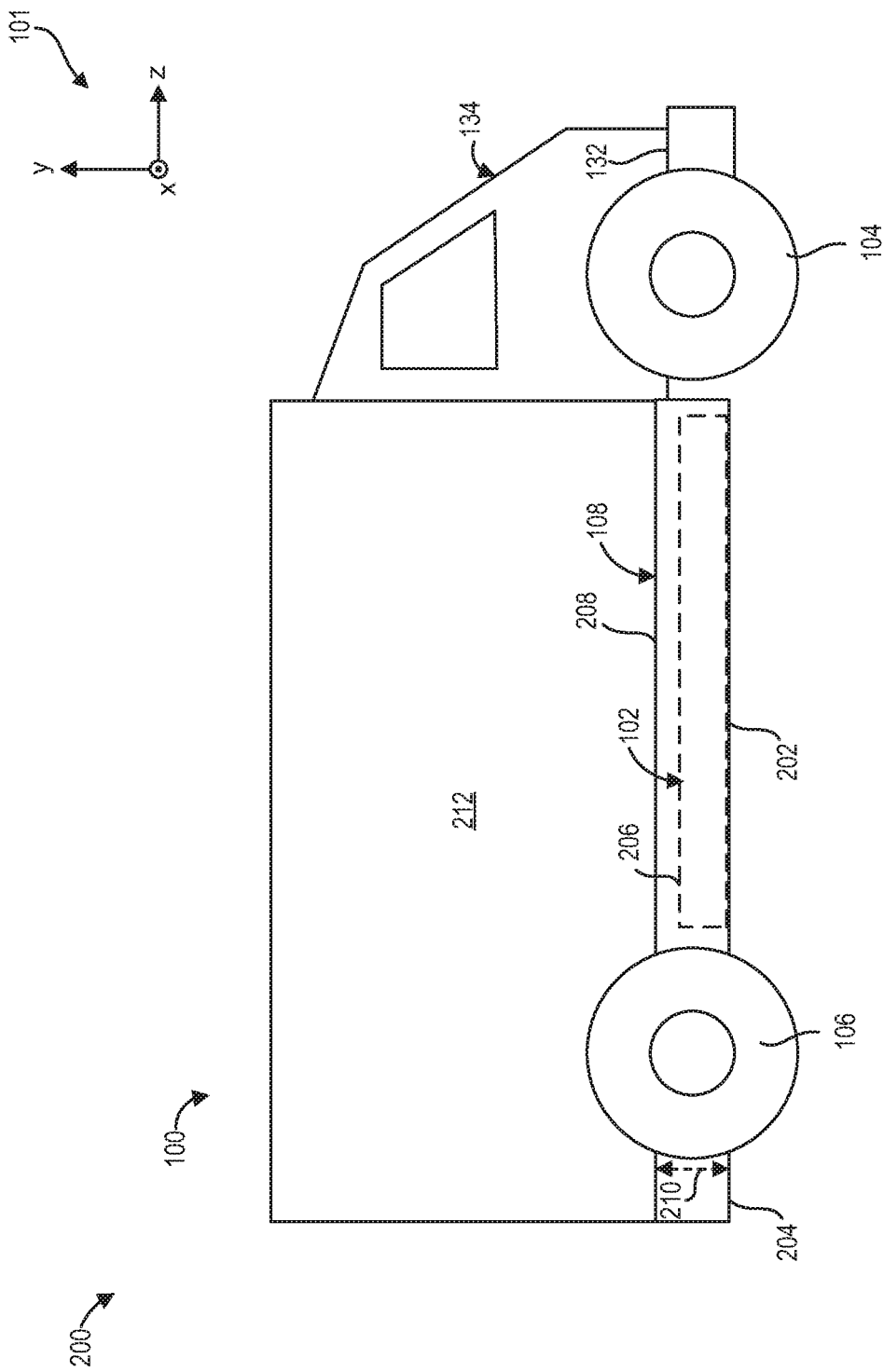
FIG. 2 shows the vehicle of FIG. 1 from a profile view.
Figure 3:
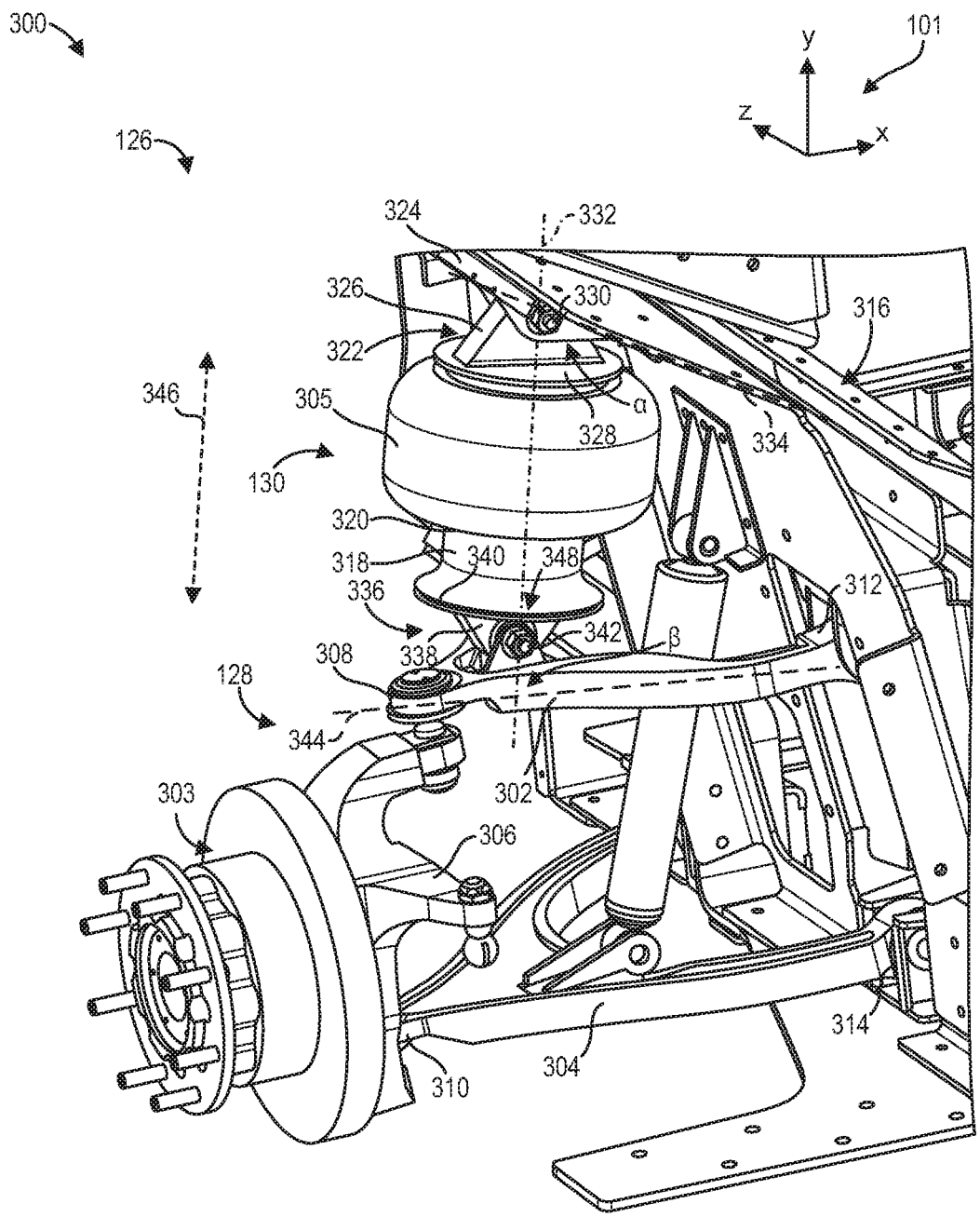
FIG. 3 shows an example of a front suspension system which may be implemented in the vehicle of FIGS. 1 and 2.
Figure 4:
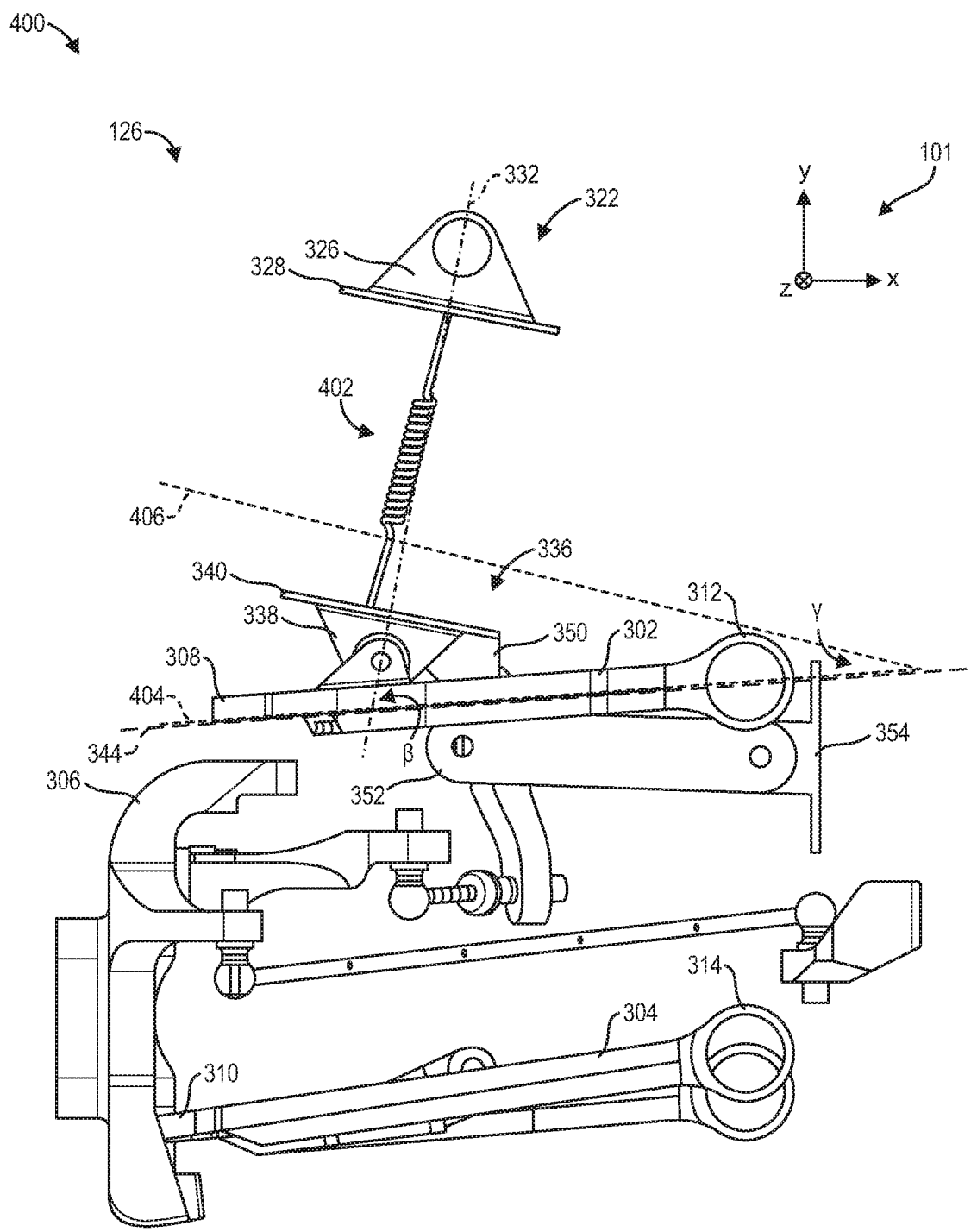
FIG. 4 shows the example of the front suspension system of FIG. 3 in a first position.
Figure 5:
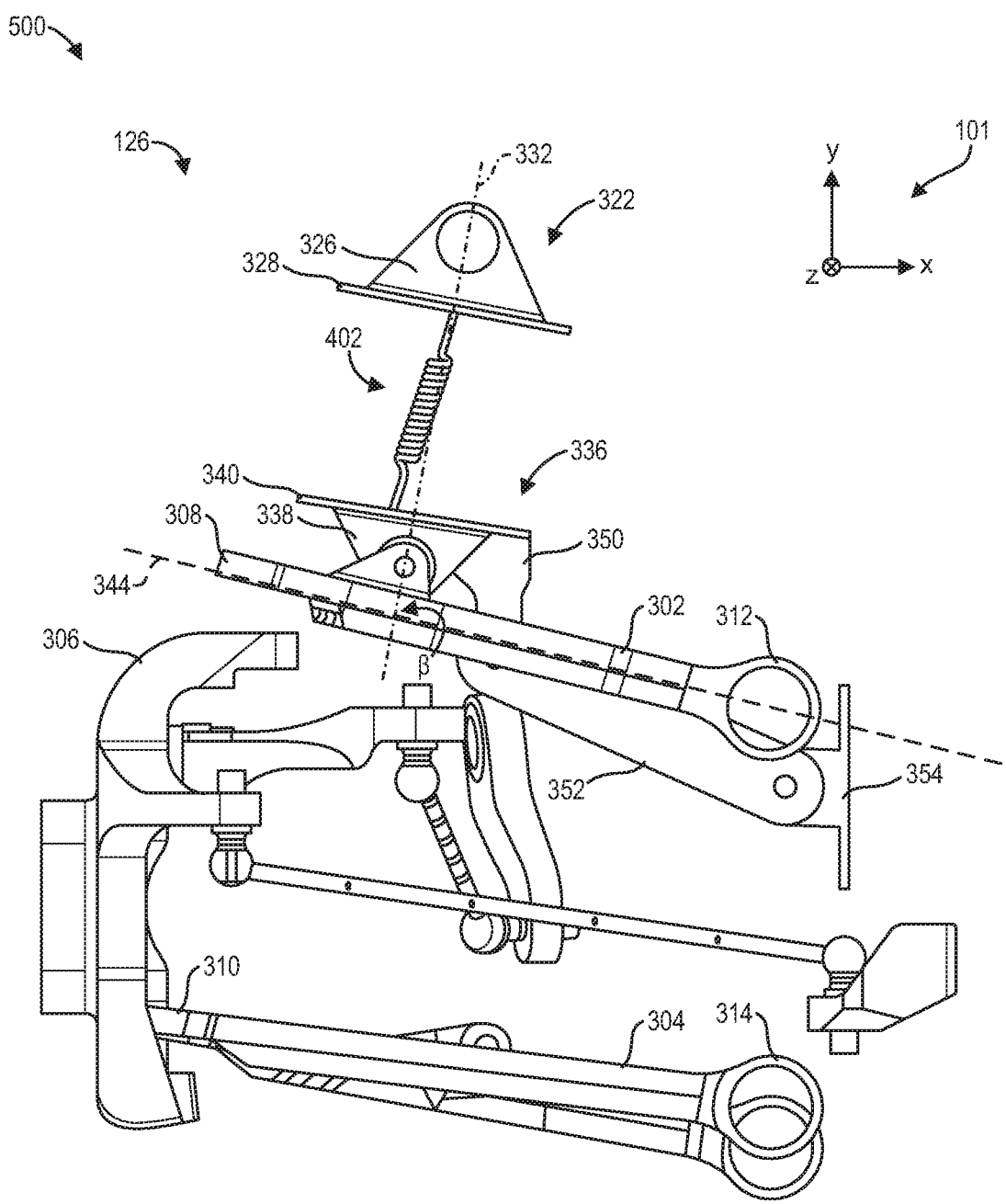
FIG. 5 shows the example of the front suspension system of FIG. 3 in a second position.
Figure 6:
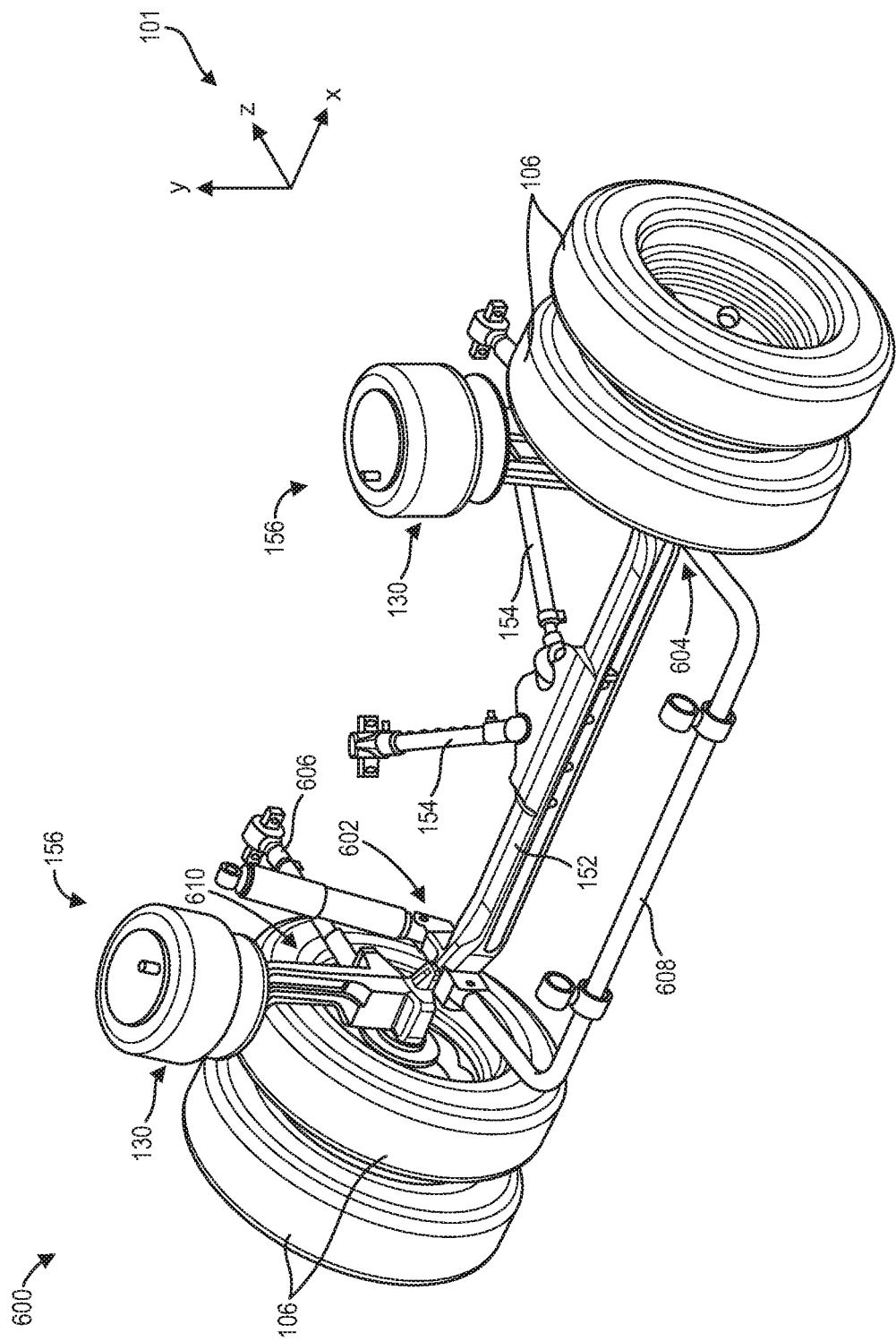
FIG. 6 shows an example of a rear suspension system which may be implemented in the vehicle of FIGS. 1 and 2.

The following description relates to suspension systems for an electric heavy-duty vehicle. The vehicle may have a low floor to enable low effort loading and unloading of objects onto a body of the vehicle. In some examples, the low floor may be a chassis of the vehicle with an integrated battery pack, as shown in FIGS. 1 and 2. To accommodate such a low positioning of the chassis and the integrated battery pack, the vehicle may be adapted with front-wheel drive. However, implementation of front-wheel drive in the vehicle may demand reconfiguration of a front suspension system of the vehicle. An example of an air suspension system at the front axle is depicted in FIG. 3. The front suspension system may combine a double wishbone suspension with an air spring. The air spring may be configured with a leveling link to accommodate angular changes in the double wishbone suspension without demanding installation of an axial guide. The leveling link may preclude obstructing or specialized components, such as the strut and the axial guiding structure of FIG. 9. An angular motion of the double wishbone suspension and pivoting of the leveling link in response to the angular motion is illustrated in FIGS. 4 and 5 where the front axle air suspension system is shown in a first position and a second position, respectively. An air suspension system may also be implemented at a rear axle of the vehicle. An example of a rear suspension system is shown in FIG. 6. The rear suspension system is further shown in greater detail in FIGS. 7 and 8.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1, a heavy-duty vehicle 100 may have an electrical system configured with a battery pack 102 as a prime mover providing electrical energy for propulsion. A set of reference axes 101 are provided for comparison between views shown, indicating a y-axis, an x-axis, and a z-axis. In one example, the y-axis may be parallel with a direction of gravity and a vertical direction, the x-axis parallel with a horizontal direction, and the z-axis parallel with a transverse direction and a longitudinal axis of the vehicle 100, e.g., parallel with a length of the vehicle 100. The vehicle 100 may be one of a variety of vehicle types, including light commercial vehicles, buses of different sizes, medium- and heavy-duty trucks, vocational vehicles, etc. The battery pack 102 may be an energy storage device configured to deliver electrical power to various components of the electrical system of the vehicle 100 including supplying current to motors coupled to front wheels 104 and/or rear wheels 106 of the vehicle 100. The battery pack 102 may extend along a chassis 108 of the vehicle 100, between the front wheels 104 and the rear wheels 106, along a portion of a length 110 of the vehicle 100. A width 112 of the battery pack 102 may be similar to a distance between innermost wheels of the rear wheels 106.

In one example, the chassis 108 of the vehicle 100 may be a skateboard chassis 108 in which the battery pack 102 is integrated, e.g., forming a continuous unit with the skateboard chassis 108. The skateboard chassis 108 may extend along a greater portion of the length 110 of the vehicle 100 than the battery pack 102, from a point behind the front wheels 104 to a rear end 116 of the vehicle. However, in other examples, the skateboard chassis 108 may vary in length, e.g., the skateboard chassis 108 may be shorter than depicted in FIG. 1. In one example, as shown in a profile view 200 of the vehicle 100 in FIG. 2, the skateboard chassis 108 may be a platform forming a floor of the vehicle 100. The skateboard chassis 108 may be formed of a solid, durable, strong material, such as aluminum, steel, fiber-reinforced materials, and/or other composite materials, able to withstand and support large loads.

The battery pack 102 may be embedded in the skateboard chassis 108, e.g., enclosed in a recess in the skateboard chassis 108, to form a single integrated structure, and may therefore also be incorporated into the floor of the vehicle 100. A bottom face 202 of the battery pack 102 may form a portion of a bottom surface 204 of the skateboard chassis 108. The battery pack 102 may therefore be biased within the skateboard chassis 108 at a lower region, with respect to the y-axis, of the skateboard chassis 108. However, in other examples, the battery pack 102 may instead be biased at an upper region of the skateboard chassis 108 with an upper face 206 of the battery pack 102 forming a portion of an upper surface 208 of the skateboard chassis 108. In yet other examples, the battery pack 102 may extend along a majority of a height 210 of the skateboard chassis 108.

The skateboard chassis 108 may provide various benefits with respect to efficient assembly and packaging of the vehicle 100. For example, the skateboard chassis 108 may be readily scalable, allowing different types of vehicle bodies to be attached. A low vertical (e.g., with respect to the y-axis) positioning of the battery pack 102 in the vehicle 100 may provide even and balanced weight distribution without adversely affecting an overall balance of the vehicle 100 (depending on a height of a payload of the vehicle 100). Rather, in some examples, the low vertical positioning of the battery pack 102 may even improve the overall balance of the vehicle 100. Furthermore, locating the battery pack 102 in the vehicle floor may increase cabin space while enclosing the battery pack 102 in a durable, rigid structure that supports and shields the battery pack 102 from contact with debris, moving vehicle components, etc.

In some instances, the vehicle 100 may be operated to transport cargo, which may demand manual loading and unloading of objects from a storage compartment 212, as shown in FIG. 2, positioned above the skateboard chassis 108. In order to increase an ease of loading/unloading, a floor of the storage compartment 212 (e.g., the skateboard chassis 108) may be maintained as low as possible, with respect to the y-axis, while providing sufficient ground clearance. Furthermore, as shown in FIG. 1, a width of the skateboard chassis 108, as defined along the x-axis, may be similar to a width 111 of the vehicle 100 to maximize a storage capacity of the storage compartment 212 except at a region between the rear wheels 106 where the width of the skateboard chassis 108 may be similar to the distance between the innermost rear wheels 106.

As shown in FIG. 1, the skateboard chassis 108 may extend from a mid-point along the length 110 of the vehicle 100, behind the front wheels 104 to the rear end 116 of the vehicle 100. The low positioning of the skateboard chassis 108, e.g., the floor of the storage compartment 212, as well as the width of the skateboard chassis 108 may preclude coupling a drive train to a rear axle 140 of the vehicle 100. As such, the vehicle 100 may be configured with front-wheel drive due to available packaging space between the front wheels 104, allowing implementation of a powertrain 124 and a drive train 120 at the front wheels 104.

The powertrain 124 includes a motor 118 arranged between a front end 114 of the vehicle 100 and a front edge 109 of the skateboard chassis 108, as well as between the front wheels 104. The motor 118 may be configured to receive electrical power from the battery pack 102. In one example, the motor 118 may be a motor/generator, able to convert mechanical energy to electrical energy to recharge the battery pack 102. The motor 118 may be coupled to a drive train 120 which, in turn, is coupled to drive shafts 122 of the front wheels 104. The drive train 120 may include components such as a transmission and a differential. The powertrain 124 may further include a torque converter arranged between the motor 118 and the transmission when the transmission is automatic, or a clutch between the motor 118 and the transmission when the transmission is manual or single-gear direct drive. Thus, electrical power drawn from the battery pack 102 by the motor 118 may be converted to torque to drive rotation of the front wheels 104 via the drive train 120. The rear wheels 106 may be trailer wheels (e.g., non-driven wheels) independently rotated on a single axle 152. Cross links 154 may extend from the axle 152 of the rear wheel 106 to the skateboard chassis 108 for support. Specifically, the cross links 154 may ensure a desired axle path throughout a range of motion of a rear suspension system (e.g., 156; as discussed in detail below) of the vehicle 100. Further, the cross links 154 may ensure that axle movement along the x-axis is restricted.

The vehicle 100 may include a first, or front, suspension system 126 at the front wheels 104 to allow relative motion between a floor 132 of a vehicle cabin 134 and the front wheels 104. The vehicle cabin 134 may be a passenger compartment positioned above and supported by the front wheels 104, as shown in FIG. 2. As depicted in FIG. 1, the floor 132 of the vehicle cabin 134 may extend between the front edge 109 of the skateboard chassis 108 and the front end 114 of the vehicle 100 and across the width 111 of the vehicle 100. In some examples, the floor 132 of the vehicle cabin 134 may be positioned vertically higher, e.g., along the y-axis, than the skateboard chassis 108, such that greater ground clearance may be provided below the floor 132 than below the skateboard chassis 108, as well as space for the powertrain 124 and the drive train 120 between the front wheels 104. The floor 132 of the vehicle cabin 134 may be continuous, in one example, with the skateboard chassis 108, so that adjustment of a vertical position of the chassis and the floor 132 of the vehicle cabin 134 occurs in unison. In other examples, however, the vehicle cabin 134 and the skateboard chassis 108 may be independent units and vertical positions, e.g., heights, of the floor 132 and of the skateboard chassis 108 may be adjusted separately.

The front suspension system 126 may include independent double wishbone or A-arm suspensions 128 having a pair of wishbone arms (as shown in FIGS. 3-5 and described further below) stacked vertically along the y-axis at each of the front wheels 104. When configured as double wishbone suspensions 128, the front suspension system 126 may be readily tuned and optimized, providing a more lightweight and compact mechanism than other types of suspension systems, such as a MacPherson strut, a multi-link suspension, etc. Furthermore, the double wishbone suspensions may provide greater clearance for the drive shafts 122 of the front wheels 104.

The vehicle 100 may further include a second, or rear, suspension system 156 at the rear wheels 106 to allow relative motion between the skateboard chassis 108 and the rear wheels 106. The rear suspension system 156 may include a simpler configuration (e.g., having fewer components) than the front suspension system 126, as the rear wheels 106 may operate with decreased pivoting motion in the x-z plane relative to the front wheels 104 (e.g., the rear wheels 106 may not be steering wheels, and therefore may not pivot substantially during turning of the vehicle 100).

In one example, each of the front and rear suspension systems 126, 156 may be configured as an air suspension system, where an air pump or compressor may be utilized to power each of the front and rear suspension systems 126, 156. Air may be pumped into one or more flexible, expandable devices, thereby inflating the devices and raising the skateboard chassis 108 from a front axle assembly (e.g., the drive shafts 122, the powertrain 124, the drive train 120) or a rear axle assembly (e.g., the axle 152) of the vehicle 100. Implementing the air suspension systems 126, 156 in the vehicle 100 may provide a smoother ride quality than steel spring suspension systems or leaf spring suspension systems.

The flexible, expandable device may be an air spring 130 (seen in FIG. 1 positioned at the front suspension system 126, but also present in the rear suspension system 156) with at least a portion of the air spring 130 formed of a flexible, durable material, such as rubber, and readily inflated and deflated. Inflation/deflation of the air spring 130 may be adjusted based on at least one height sensor 136 coupled to the floor 132 of the vehicle cabin 134 and/or the skateboard chassis 108 to measure a vertical position of the floor 132 and/or skateboard chassis 108 proximate to the air spring 130. A pressure of each air spring 130 may be monitored by a pressure sensor 138. The at least one height sensor 136 and the pressure sensors 138 may be communicatively coupled to a controller 150, which may be an electronic control unit (ECU).

The controller 150 may be a computing device, such as a microcomputer that includes a processor unit, a non-transitory computer-readable storage medium device, input/output ports, memory, and a data bus. The computer-readable storage medium device included in the controller 150 may be programmable with computer readable data representing instructions executable by the processor for performing various control routines and methods. The controller 150 may receive requests from an operator of the vehicle 100 to perform the various control routines and methods.

For example, one air spring 130 may be positioned at each wheel hub assembly 126, 156, and the controller 150 may receive requests from the operator to lower or raise the floor 132 of the vehicle cabin 134 and/or the skateboard chassis 108 by simultaneously or independently compressing or expanding the air springs 130. In some examples, all of the air springs 130 may by simultaneously compressed or expanded responsive to a request from the operator to lower or raise the floor 132. In some examples, only a portion of the air springs 130 (e.g., positioned at a first side of the vehicle 100) may be simultaneously compressed or expanded without compressing or expanding a remaining portion of the air springs 130 (e.g., positioned at a second side of the vehicle 100, the second side being opposite to the first side). In such examples, compressed air consumption (and thereby energy consumption) may be reduced by only compressing/expanding the portion of the air springs 130. As an example, a portion of the air springs 130 on a left side or a right side of the vehicle 100 may be compressed responsive to a request from the operator to kneel the vehicle 100 at the left side or the right side, respectively (e.g., a curb side, such as when the operator or a passenger exits the vehicle 100). As another example, a portion of the air springs 130 on a front side (e.g., positioned at the front wheel hub assemblies 126) or a rear side (e.g., positioned at the rear wheel hub assemblies 156) of the vehicle 100 may be compressed responsive to a request from the operator to kneel the vehicle 100 at the front side or the rear side, respectively. In additional or alternative examples, the air springs 130, or portions thereof, may be sequentially compressed or expanded. For example, a portion of the air springs 130 (e.g., positioned at the front wheel hub assemblies 126) may be simultaneously compressed or expanded and thereafter a remaining portion of the air springs 130 (e.g., positioned at the rear wheel hub assemblies 156) may be simultaneously compressed or expanded.

The controller 150 may receive various signals from a plurality of sensors of the vehicle 100 (e.g., the at least one height sensor 136, the pressure sensors 138, etc.) and utilize the information to operate various actuators of the vehicle 100 based on the instructions. For example, the controller 150 may receive data from the at least one height sensor 136 to determine whether the floor 132 of the vehicle cabin 134 is positioned sufficiently high enough to circumvent contact between the floor 132 and the drive shafts 122 at the front wheels 104 when the vehicle 100 encounters uneven terrain. The vehicle 100 may include various other sensors not shown in FIG. 1 to monitor various operating conditions, such as engine sensors to monitor parameters such as pressure, temperature, speed, etc., amongst others.

A perspective view 300 of a portion of the front suspension system 126 is shown in FIG. 3. One of the double wishbone suspensions 128 is depicted in FIG. 3, including a first wishbone arm 302 stacked over and spaced away from a second wishbone arm 304. The first wishbone arm 302 and the second wishbone arm 304 may have similar geometries and dimensions, such that an orthographic projection of the first wishbone arm 302 may substantially overlap with an orthographic projection of the second wishbone arm 304 along the y-axis. The first and second wishbone arms 302, 304 may be linked by an upright 306 extending along the y-axis between a first end 308 of the first wishbone arm 302 and a first end 310 the second wishbone arm 304. The upright 306 may be fixedly coupled, e.g., attached via welding, fasteners, etc., to a front wheel hub assembly 303 of one of the front wheels, e.g., the front wheels 104 shown in FIGS. 1 and 2. Second ends 312 of the first wishbone arm 302 and second ends 314 of the second wishbone arm 304 may be coupled to a frame 316 of the vehicle. The vehicle frame 316 may support and couple to the floor of the vehicle cabin, e.g., the floor 132 of the vehicle cabin 134 shown in FIGS. 1 and 2.

The front suspension system 126 may also include the air spring 130, as described above, positioned above the front wheel hub assembly 303 with respect to the vehicle (e.g., along a positive direction of the y-axis) and substantially vertical, with respect to the y-axis. Configuring the air spring 130 in this way may permit increased lowering of the vehicle cabin floor relative to alternative configurations (e.g., substantially diagonal with respect to the y-axis, positioned at least partially adjacent to the front wheels along the x-axis, etc.). Further, by positioning the air spring 130 above the front wheel hub assembly 303 (and its corresponding drive shaft), the air spring 130 may not interfere with a desirable coupling of the drive shaft to the wheel. As such, no cost-prohibitive and configuration-specific design is employed herein. Accordingly, it will be appreciated that the air spring 130 described herein may be implemented in many types of heavy-duty vehicles with relative ease. In this way, the generalized configuration of the present disclosure may be implemented in a heavy-duty vehicle to facilitate loading/unloading thereof with ease of implementation and at reduced cost.

As shown in FIG. 3, the air spring 130 has an air bag 305 which may be coupled to and partially surround a stem 318. The air bag 305 may be formed of a flexible, durable material, such as rubber, and the stem 318 of the air spring 130 may be formed of a more rigid material. An upper portion (not shown), relative to the y-axis, of the stem 318 may protrude into an interior volume of the air spring 130. A bottom edge 320 of the air bag 305 may seal around the stem 318 so that the air bag 305 is a closed structure and air inside of the air bag 305 does not exchange with air outside of the air bag 305. The air bag 305 may be coupled to the vehicle frame 316 by a first or upper link 322 extending between a top of the air bag 305 and a first bracket 324 attached to the vehicle frame 316, the first link 322 being pivotably coupled to the first bracket 324.

The first link 322 may have a first triangular portion 326 extending upwards away from the top of the air spring 130 and a first plate 328 to which the first triangular portion 326 is fixedly (e.g., permanently) coupled. The first plate 328 may be attached (directly coupled) to the top of the air spring 130 via fasteners (e.g., bolts; not shown), forming a sealed connection between the first plate 328 and the air bag 305 and anchoring the air spring 130 to the vehicle frame 316. The first triangular portion 326 of the first link 322 may be coupled to the first bracket 324 with a first fastener 330. The first triangular portion 326 may be secured to the first bracket 324 such that the first link 322 does not move relative to the first bracket 324 or the vehicle frame 316. For example, regardless of inflation/deflation of the air bag 305 or tilting of the first wishbone arm 302, an angle $\alpha$ between a central axis 332 of the air spring 130 and a plane of the vehicle frame 316 (a cross-section of the plane being indicated by dashed line 334) does not substantially change.

The stem 318 may be attached to the first wishbone arm 302 by a second or lower link 336. Similar to the first link 322, the second link 336 may have a second triangular portion 338, oriented upside-down relative to the first triangular portion 326 of the first link 322, fixedly coupled to a second plate 340. The second plate 340 of the second link 336 may be attached (directly coupled) to a bottom of the stem 318 of the air spring 130 via fasteners (e.g., bolts; not shown). In some examples, the second link 336 may extend between the stem 318 and a second bracket (not shown at FIG. 3), the second link 336 being pivotably coupled to the vehicle frame 316 by coupling to the second bracket via a control arm bushing 348. The second link 336 may pivot around a central axis of the control arm bushing 348 while being retained by a second fastener 342 passing through the central axis of the control arm bushing 348.

The second link 336 may be a leveling link 336 configured to inhibit buckling of the air spring 130 during pivoting of the first wishbone arm 302 within a target angular range, the target angular range described in further detail below. Accordingly, the triangular portion 338 of the leveling link 336 may be pivotably coupled to the first wishbone arm 302 by the second fastener 342. Specifically, a coupling of the leveling link 336 to the first wishbone arm 302 at the second fastener 342 may be configured to allow the air spring 130 and the first wishbone arm 302 to pivot with respect to one another. For example, an angle $\beta$ between the central axis 332 and a plane of the first wishbone arm 302 (a cross-section of the plane being indicated by dashed line 344) may vary as the front suspension system 126 is operated. The air bag 305 may be inflated or deflated to adjust a height of the vehicle cabin floor relative to the front axle assembly, causing a height 346 of the air spring 130 to increase or decrease accordingly. The inflation/deflation of the air bag 305 may result in tilting of at least the first wishbone arm 302 relative to the x-z plane (e.g., relative to a horizontal plane). In some examples, the second wishbone arm 304 may tilt in unison with the first wishbone arm 302.

Tilting of the first and second wishbone arms 302, 304, may be enabled by arranging pivotable joints, such as ball joints, at the respective first ends 308, 310 of the first and second wishbone arms 302, 304. As the air bag 305 inflates and the height 346 of the air spring 130 increases, the first end 308 of the first wishbone arm 302 may be driven down, with respect to the y-axis. Conversely, as the air bag 305 deflates and the height 346 of the air spring 130 decreases, the first end 308 of the first wishbone arm 302 may be pulled up, with respect to the y-axis. As described above, the air spring 130 may be fixedly coupled to the vehicle frame 316, at the first link 322, inhibiting rotational movement of the air spring 130 relative to the vehicle frame 316. Without the second link 336 allowing rotational movement between the air spring 130 and the first wishbone arm 302, the stem 318 may be compelled to become misaligned with the central axis 332, e.g., the stem 318 may become tilted relative to the central axis 332. Tilting of the stem 318 may distort the air bag 305, increasing a likelihood of leaks. Further, a maximum change (e.g., lowering) of the height 346 may be decreased by tilting of the stem 318.

In air suspension systems where the air spring 130 has a fixed (e.g., non-pivotable) coupling to the first wishbone arm 302, tilting of the first wishbone arm 302 may be compensated via an axial guiding structure extending along the height 346 of the air spring 130. In some examples, the axial guiding structure may be configured as a piston component and a cylinder component (e.g., a MacPherson strut), with the two components being mated so as to allow longitudinal movement while retaining coaxial compression/expansion of the air spring 130. In additional or alternative examples, the axial guiding structure may be positioned concentrically about the air spring 130 (analogous to a coil-over shock absorber). In some examples, the axial guiding structure may further link one or both of the wishbone arms 302, 304 to the vehicle frame 316. However, the axial guiding structure may pose packaging challenges in such configurations, as the axial guiding structure may interfere with the drive shaft. Further, fixing of the air spring 130 to the first wishbone arm 302 may result in a narrower angular range on the first and second wishbone arms 302, 304, decreasing the maximum change of the height 346.

Figure 9:
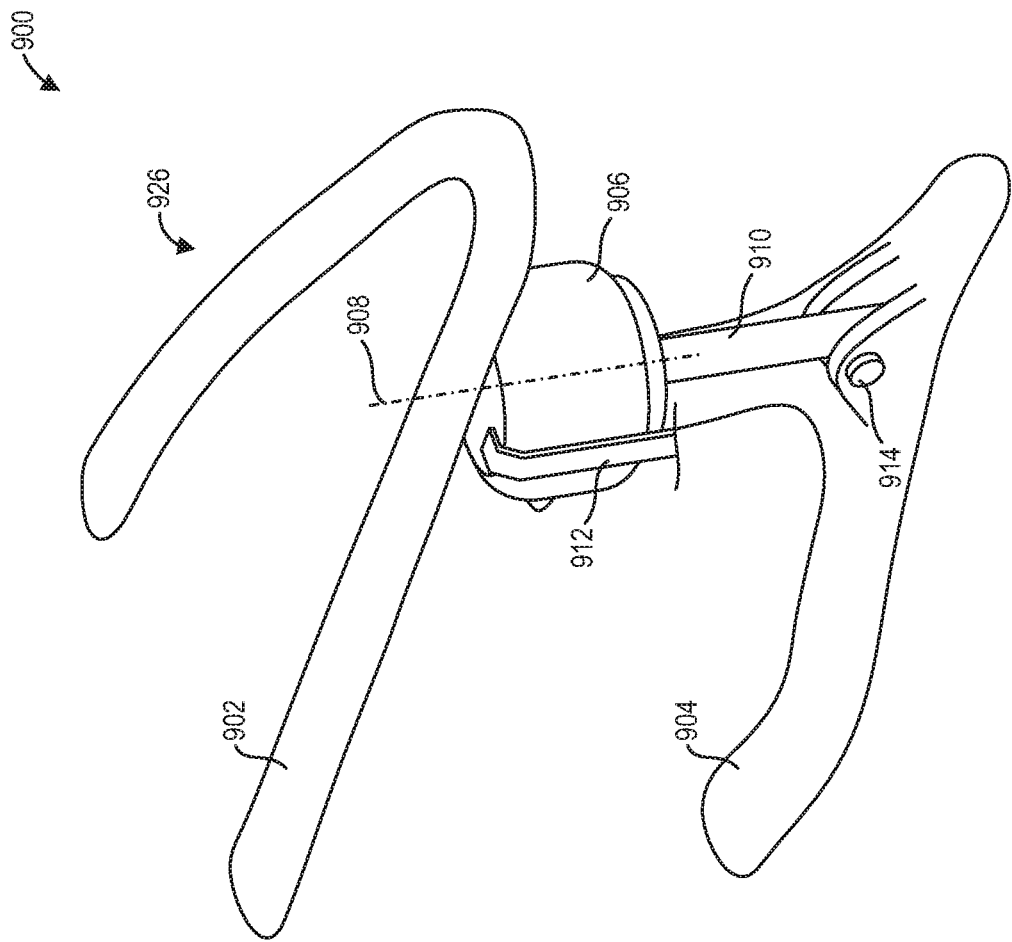
FIG. 9 shows an example of a double wishbone suspension system having a strut and an axial guiding structure.

For example, and as shown in perspective view 900 of FIG. 9, a double wishbone suspension system 926 may include an air spring 906 positioned between upper and lower wishbone arms 902 and 904. Compression/expansion of the air spring 906 along a central axis 908 thereof may be substantially maintained by coupling the air spring 906 to a strut 910 and/or an axially guiding structure 912 extending a length of the air spring 908. The strut 910 may be non-pivotably affixed to the lower wishbone arm 904 via one or more fasteners 914. The axially guiding structure 912 may also be non-pivotably affixed to the lower wishbone arm 904 (e.g., via one or more fasteners; not shown). Though the axially guiding structure 912 is depicted as a bar, other configurations may be implemented, such as a mechanical spring circumscribing the air spring 906.

The double wishbone suspension system 926 may include an increased number of obstructing or specialized components as compared to the front suspension system 126 depicted in FIG. 3. For example, the strut 910 and/or the axially guiding structure 912 may obstruct a drive shaft (not shown) from directly coupling to a wheel hub assembly (not shown) of a vehicle including the double wishbone suspension system 926. Further, in examples where the axially guiding structure 912 is included in the double wishbone suspension system 926, the air spring 906 may be specially adapted to receive and conform to the axially guiding structure 912.

However, and referring again to FIG. 3, by adapting the front suspension system 126 with the leveling link 336, a position and alignment of the air spring 130 may be maintained without such obstructing or specialized components and without interference to the drive shaft, while still allowing the first wishbone arm 302 (and the second wishbone arm 304) to pivot through the target angular range. The target angular range may depend on a configuration of the front suspension system 126, such as the specific configuration of the air spring 130, the wishbone arms 302, 304, and the vehicle frame 316, and machining specifications of the control arm bushings (e.g., the control arm bushing 348, a control arm bushing circumscribing the first fastener 130, etc.). In one example, the target angular range may include up to 30 degrees of rotation. In other examples, the target angular range may be various angular ranges depending on a configuration of the front suspension system 126, such as up to 20 degrees or up to 50 degrees. In this way, the air spring 130 may be configured in the front suspension system 126 for substantially axial compression without any guiding structure extending a length thereof.

Compression and expansion of the air spring 130 is coupled to pivoting of the first and second wishbone arms 302, 304. As shown in FIGS. 4 and 5, the first and second plates 328, 340 may be maintained substantially parallel to one another during compression and expansion of the air spring. FIG. 4 depicts a first side view 400 of the front suspension system 126 in a first, maximally expanded position, and FIG. 5 depicts a second side view 500 of the front suspension system 126 in a second, maximally compressed position. The air spring, which may be the air spring 130 of FIGS. 1 and 3, is represented as a mechanical spring 402 in FIGS. 4 and 5 so as to more clearly depict spring compression and expansion.

The first, maximally expanded position of the front suspension system 126 may be defined by a first plane (a cross-section of the first plane being indicated by a dashed line 404), coterminous with the plane of the first wishbone arm 302 (indicated by the dashed line 344) in the first position. The second, maximally compressed position of the front suspension system 126 may be defined by a second plane (a cross-section of the second plane being indicated by a dashed line 406), coterminous with the plane of the first wishbone arm 302 in the second position. The first wishbone arm 302, which may be in simultaneous pivoting motion with the second wishbone arm 304, may freely pivot between the first and second planes. Accordingly, the first and second wishbone arms 302, 304 may freely pivot within the target angular range, an upper limit of which may be defined by an angle γ between the first and second planes.

Though not explicitly depicted at FIGS. 4 and 5 (but described above with reference to FIG. 3), the respective first ends 308, 310 of the first and second wishbone arms 302, 304 may be coupled to the upright 306 and the respective second ends 312, 314 of the first and second wishbone arms 302, 304 may be coupled to the vehicle frame (e.g., 316). Accordingly, as the first and second wishbone arms 302, 304 pivot between the first and second positions, the upright 306 may move relative to the frame of the vehicle.

The air spring may be coupled at opposite ends to the upper and leveling links 322, 336, which may include the respective first and second triangular portions 326, 338 and the respective first and second plates 328, 340. As shown, the upper and leveling links 322, 336 may maintain substantially axial compression of the air spring by respectively maintaining a position of the first and second plates 328,

340. The upper link 322 may be pivotably coupled to the vehicle frame (e.g., 316), as described above with reference to FIG. 3. The leveling link 336 may also be pivotably coupled to the frame of the vehicle, the leveling link 336 extending from a coupling at the air spring and the first wishbone arm 302 to the frame of the vehicle, as further described above with reference to FIG. 3. Specifically, the leveling link 336 may include a first coupling element 350 extending from the second plate 340 to a second coupling element 352, the first and second coupling elements 350, 352 being pivotably coupled to one another. The second coupling element 352 may extend from the first coupling element 350 to a second bracket 354, the second coupling element 352 being pivotably coupled to the second bracket 354.

As shown, the second coupling element 352 may be enabled to pivot simultaneously with the first and second wishbone arms 302, 304, such that the second plate 340 may be maintained substantially parallel to the first plate 328 as the first and second wishbone arms 302, 304 pivot through the target angular range. Accordingly, the angle β between the plane of the first wishbone arm 302 and the central axis 332 may be substantially maintained as the front suspension system 126 moves from the first, maximally expanded position to the second, maximally compressed position.

Figure 7:
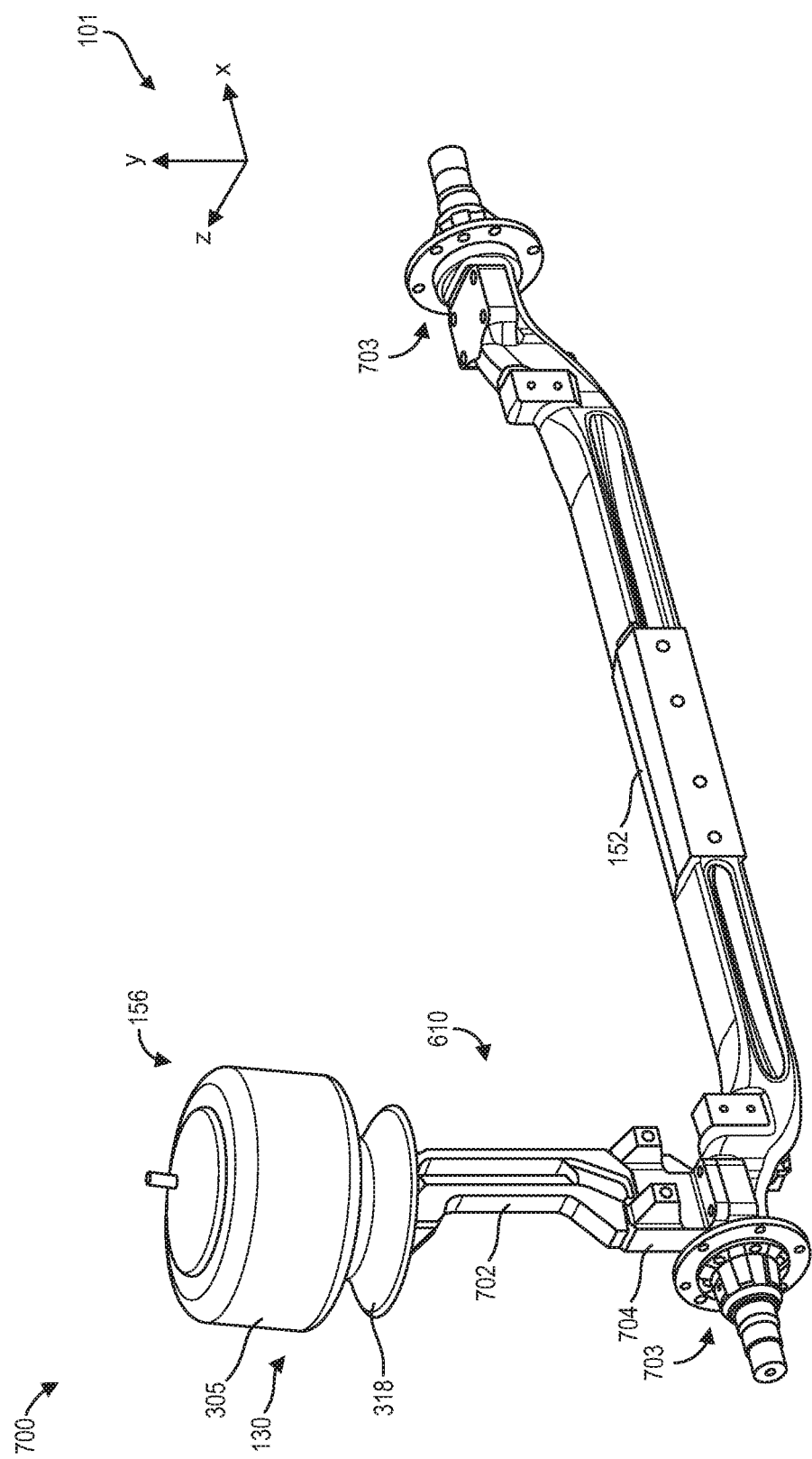
FIG. 7 shows a detailed view of the example of the rear suspension system of FIG. 6.
Figure 8:
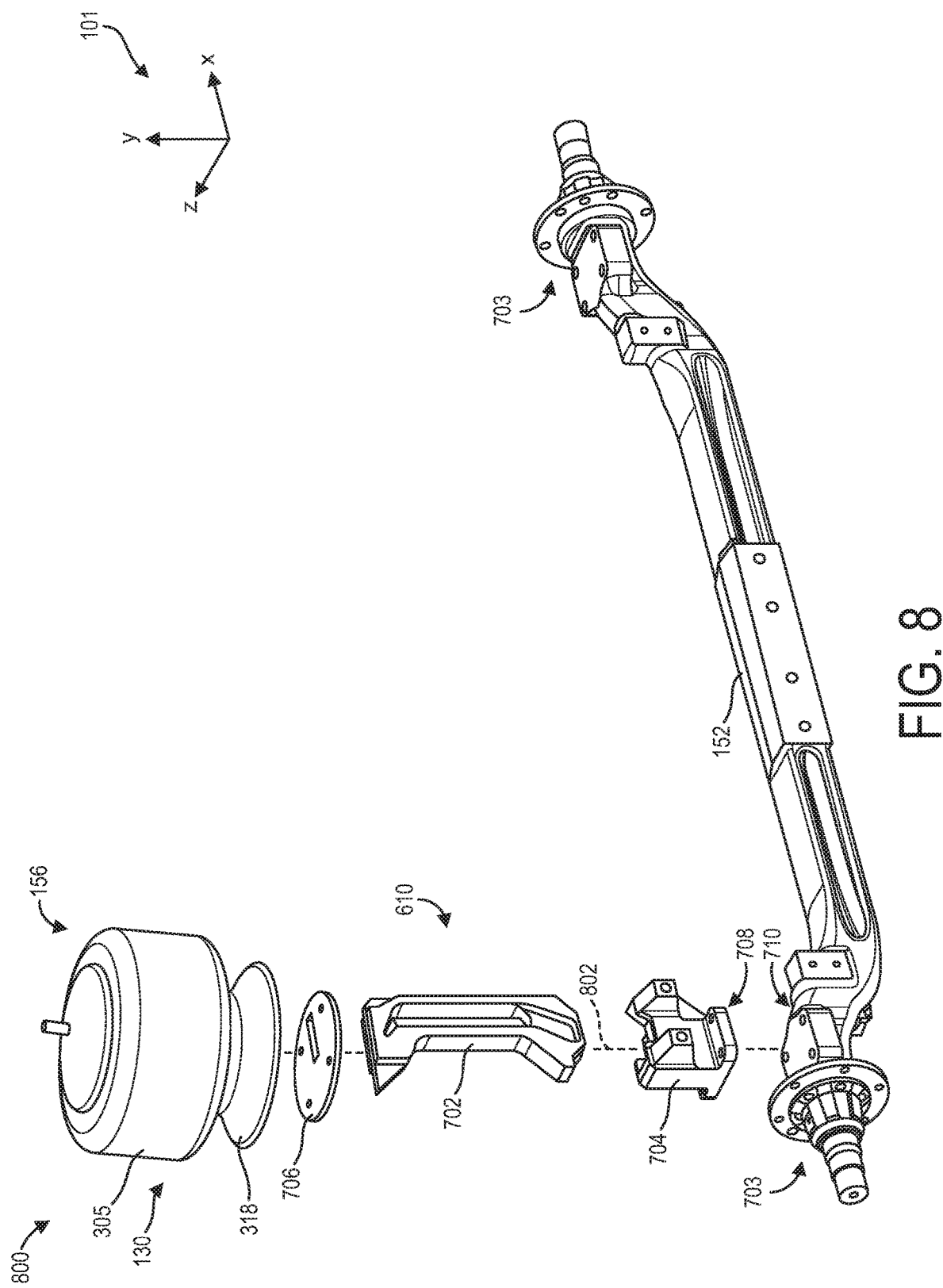
FIG. 8 shows an exploded view of the example of the rear suspension system of FIG. 6.

An air suspension system may also be provided at the rear axle 152 of the vehicle (e.g., 100), as shown in FIGS. 6-8. Accordingly, a perspective view 600 of an example of the rear suspension system 156 is shown in FIG. 6. Rear wheels 106 may be coupled to the rear axle 152, where the rear axle 152 may extend along the x-axis from an outermost rear wheel 106 on a first end 602 of the rear axle 152 to an outermost rear wheel 106 on an opposite, second end 604 of the rear axle 152. The vehicle being configured for front-wheel drive, the rear axle 152 may not be driven, and the rear wheels 106 may rotate freely about the rear axle 152. The rear axle 152 may be fixed in position relative to the vehicle, both directly coupled to the skateboard chassis (e.g., 108) of the vehicle and further coupled to the skateboard chassis via suspension rods (e.g., the cross links 154, lateral support links 606, etc.). The rear axle 152 may further be coupled to an anti-roll bar 608. The anti-roll bar 608 may also be coupled to the skateboard chassis via one or more types (e.g., three types) of bushings. In this way, the anti-roll bar 608 may maintain substantially free motion of the rear suspension system 156 along the y-axis. Further, the anti-roll bar 608 may mitigate rolling of the vehicle and/or provide overall stabilization when rear wheels 106 on one side of the rear axle 152 (e.g., a left side or a right side) are raised/misaligned as a result of an uneven driving surface. In some examples, to provide additional braking torque, each of the rear wheels 106 may be provided with drum brakes.

The rear suspension system 156 may include the air spring 130 (described in further detail above with reference to FIG. 3), the air spring 130 positioned above a rear wheel hub assembly (described in further detail below with reference to FIGS. 7 and 8) with respect to the vehicle (e.g., along a positive direction of the y-axis) and substantially vertical, with respect to the y-axis. Configuring the air spring 130 in this way may permit increased lowering of the skateboard chassis (e.g., 108) relative to alternative configurations (e.g., substantially diagonal with respect to the y-axis, positioned at least partially adjacent to the rear wheels 106 along the x-axis, etc.). Further, by positioning the air spring 130 above the rear wheel hub assembly, the air spring 130 may not interfere with a desirable coupling of the rear axle 152 to the rear wheels 106. Accordingly, it will be appreciated that the air spring 130 described herein may be implemented in many types of heavy-duty vehicles with relative ease. In this way, the generalized configuration of the present disclosure may be implemented in a heavy-duty vehicle to facilitate loading/unloading thereof with ease of implementation and at reduced cost.

The air spring 130 may be fixedly coupled to the rear axle 152 via a link 610. Accordingly, the link 610 may extend from the air spring 130 to the rear axle 152 at an end thereof (e.g., the first end 602 or the second end 604). Specifically, and as shown in detail view 700 and exploded view 800 of FIGS. 7 and 8, respectively, the link 610 may include a first coupling element 702, a second coupling element 704, and a plate 706 vertically coupled along an axis 802 (the axis 802 being parallel to the y-axis).

As shown, the plate 706 may be attached (directly coupled) to a bottom of the stem 318 of the air spring 130 via fasteners (e.g., bolts; not shown). The first coupling element 702 may extend along the axis 802 from the plate 706 to the second coupling element 704, the first coupling element 702 being fixedly (e.g., permanently) coupled to each of the plate 706 and the second coupling element 704. The second coupling element 704 may extend along the axis 802 from the first coupling element 702 to the rear axle 152, the second coupling element 704 being attached (directly coupled) to the rear axle 152 via fasteners (e.g., bolts; not shown). In one example, the second coupling element 704 may be provided with a plurality of holes 708 respectively complementary to a plurality of holes 710 provided in the rear axle 152. Accordingly, the link 610 may be attached (directly coupled) to the rear axle 152 via a plurality of fasteners respectively provided in complementary pairs of holes 708 and 710.

The air spring 130 may be positioned directly above a rear wheel hub assembly 703, such that compression of the air spring 130 may permit increased lowering of the skateboard chassis (e.g., 108). Specifically, compression of the air bag 305 may be directed vertically along the axis 802 by the link 610, the link 610 being aligned with the air spring 130 to compel the stem 318 to press directly into the air bag 305. In this way, the air spring 130 may be configured in the rear suspension system 156 for substantially axial compression without any guiding structure extending a length thereof.

In this way, an air suspension system is provided for a low-floor electric heavy-duty vehicle. The air suspension system may include air springs respectively positioned above wheel hub assemblies of the low-floor electric heavy-duty vehicle. In one example, a first pair of air springs may be respectively vertically positioned above a pair of front wheel hub assemblies and a second pair of air springs may be respectively positioned above a pair of rear wheel hub assemblies. A technical effect of respectively vertically positioning the first and second pairs of air springs above the front and rear wheel hub assemblies is that a lowering of a cabin floor of the low-floor electric heavy-duty vehicle may be increased relative to alternative air suspension system configurations.

In some examples, the first pair of air springs may be configured differently from the second pair of air springs with respect to the wheel hub assemblies. For example, each of the first pair of air springs may be pivotably coupled to a frame of the low-floor electric heavy-duty vehicle via a first link and a second link and the second pair of air springs may be fixedly coupled via a third link to a single rear axle of the low-floor electric heavy-duty vehicle. Specifically considering the first pair of air springs, the first and second links may be disposed at opposite ends of a given air spring, permitting substantially axial compression of the given air spring without physical axial constraints. The first and second links may further allow increased compression of the given air spring by providing correspondingly increased range of motion via respective pivoting motions thereof. Specifically considering the second pair of air springs, the third link may be positioned directly below a given air spring with respect to the low-floor electric heavy-duty vehicle, so as to provide direct axial compression thereto. Accordingly, none of the first and second pairs of air springs may be provided with a guiding structure extending a length thereof. A technical effect of configuring the first and second pairs of air springs as described is that the air suspension system may be adapted for specific drive train configurations of the electric heavy-duty vehicle (e.g., front-wheel drive), while not interfering with drive shafts of the wheel hub assemblies and permitting easier manufacture and maintenance by reducing a total number of obstructing or specialized parts (e.g., the guiding structure).

In one example, a system for a vehicle, the system comprising a wheel hub assembly coupled to a frame of the vehicle via a first wishbone arm and a second wishbone arm, and an air spring coupled at opposite ends to a first link and a second link, each of the first link and the second link being pivotably coupled to the frame of the vehicle, the second link further being pivotably coupled to the first wishbone arm, wherein the air spring is positioned above the wheel hub assembly with respect to the vehicle. A first example of the system further includes wherein the air spring is coupled to the first link and the second link via respective first and second plates, the first and second plates being maintained substantially parallel to one another during compression and expansion of the air spring. A second example of the system, optionally including the first example of the system, further includes wherein the air spring comprises an air bag partially surrounding a stem, and wherein the first plate is directly coupled to the air bag and the second plate is directly coupled to the stem. A third example of the system, optionally including one or more of the first and second examples of the system, further includes wherein the second link is configured to inhibit buckling of the air spring during pivoting of the first wishbone arm within a target angular range. A fourth example of the system, optionally including one or more of the first through third examples of the system, further includes wherein the target angular range comprises up to 30 degrees of rotation. A fifth example of the system, optionally including one or more of the first through fourth examples of the system, further includes wherein the first wishbone arm and the second wishbone arm are coupled to opposite ends of the wheel hub assembly, such that the first wishbone arm is stacked over and spaced away from the second wishbone arm, an orthographic projection of the first wishbone arm substantially overlapping with an orthographic projection of the second wishbone arm. A sixth example of the system, optionally including one or more of the first through fifth examples of the system, further includes wherein the vehicle is configured with an electrically-powered powertrain.

In another example, a system for a vehicle, the system comprising a pair of front wheel hub assemblies configured with a front air suspension system, the front air suspension system comprising a first pair of air springs respectively positioned over the pair of front wheel hub assemblies, and a pair of rear wheel hub assemblies configured with a rear air suspension system, the rear air suspension system comprising a second pair of air springs respectively positioned over the pair of rear wheel hub assemblies, wherein each of the first and second pairs of air springs is configured for substantially axial compression without any guiding structure extending a length thereof, the substantially axial compression of the first and second pairs of air springs lowering a cabin floor of the vehicle. A first example of the system further includes wherein the front air suspension system comprises, for each respective air spring of the first pair of air springs, a respective leveling link coupled to a stem of the respective air spring, the respective leveling link configured to maintain the substantially axial compression of the respective air spring. A second example of the system, optionally including the first example of the system, further includes wherein each respective air spring of the first pair of air springs is pivotably coupled to a frame of the vehicle via the respective leveling link and a respective upper link, the respective upper link coupled to the respective air spring being positioned opposite to the respective leveling link. A third example of the system, optionally including one or more of the first and second examples of the system, further comprises a double wishbone front suspension, the substantially axial compression of each air spring of the first pair of air springs being coupled to pivoting of the double wishbone front suspension. A fourth example of the system, optionally including one or more of the first through third examples of the system, further comprises a pair of front drive shafts, the first pair of air springs not being fixedly coupled to the pair of front drive shafts. A fifth example of the system, optionally including one or more of the first through fourth examples of the system, further comprises a rear axle, the second pair of air springs being fixedly coupled to the rear axle. A sixth example of the system, optionally including one or more of the first through fifth examples of the system, further includes wherein the vehicle is an electric vehicle configured with front-wheel drive.

In yet another example, a method for an electric heavy-duty vehicle, the method comprising compressing air springs in a suspension system of the electric heavy-duty vehicle responsive to a request to lower a cabin floor of the electric heavy-duty vehicle, the air springs being positioned above respective wheel hub assemblies of the electric heavy-duty vehicle, and expanding the air springs responsive to a request to raise the cabin floor, wherein an angle between a central axis of each respective air spring and a plane of a frame of the electric heavy-duty vehicle does not change substantially during compression and expansion of the respective air spring. A first example of the method further includes wherein the electric heavy-duty vehicle comprises a battery pack extending along a chassis of the electric heavy-duty vehicle, a width of the battery pack being substantially equal to a width of the chassis, and wherein a width of the cabin floor extends between two rear wheel hub assemblies of the electric heavy-duty vehicle. A second example of the method, optionally including the first example of the method, further includes wherein two of the air springs are respectively positioned above two front wheel hub assemblies of the electric heavy-duty vehicle, and wherein the two of the air springs respectively positioned above the two front wheel hub assemblies are axially guided by a leveling link. A third example of the method, optionally including one or more of the first and second examples of the method, further includes wherein two of the air springs are respectively positioned above two rear wheel hub assemblies of the electric heavy-duty vehicle, and wherein the two of the air springs respectively positioned above the two rear wheel hub assemblies are coupled to a single rear axle of the electric heavy-duty vehicle. A fourth example of the method, optionally including one or more of the first through third examples of the method, further includes wherein the air springs in the suspension system are simultaneously compressed based on the request to lower the cabin floor. A fifth example of the method, optionally including one or more of the first through fourth examples of the method, further includes wherein a portion of the air springs are compressed independently from a remaining portion of the air springs based on the request to lower the cabin floor, wherein the portion of the air springs is positioned at a first side of the electric heavy-duty vehicle, the first side being one of a front side, a rear side, a left side, and a right side, and wherein the remaining portion of the air springs is positioned at a second side of the electric heavy-duty vehicle, the second side being opposite to the first side.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, the system comprising:
    a wheel hub assembly coupled to a frame of the vehicle via a first wishbone arm and a second wishbone arm; and
    an air spring directly and pivotably coupled at opposite ends to a first link and a second link, the first link positioned above the second link, each of the first link and the second link being pivotably coupled to the frame of the vehicle, the second link further being pivotably coupled to the first wishbone arm, wherein the air spring is positioned above the wheel hub assembly with respect to the vehicle.

2. The system of claim 1, wherein the air spring is coupled to the first link and the second link via respective first and second plates, the first and second plates being maintained substantially parallel to one another during compression and expansion of the air spring.

3. The system of claim 2, wherein the air spring comprises an air bag partially surrounding a stem;
    wherein the first plate is directly coupled to the air bag and the second plate is directly coupled to the stem; and
    wherein the second link is further pivotably coupled to the frame of the vehicle.

4. The system of claim 3, wherein the second link is configured to inhibit buckling of the air spring during pivoting of the first wishbone arm within a target angular range, wherein the second link further comprising a first coupling element extending from the second plate to a second coupling element, the first and second coupling elements being pivotably coupled to one another, the second coupling element further being pivotably coupled to a bracket coupled to the frame of the vehicle.

5. The system of claim 4, wherein the target angular range comprises up to 30 degrees of rotation.

6. The system of claim 1, wherein the first wishbone arm and the second wishbone arm are coupled to opposite ends of the wheel hub assembly, such that the first wishbone arm is stacked over and spaced away from the second wishbone arm, an orthographic projection of the first wishbone arm substantially overlapping with an orthographic projection of the second wishbone arm.

7. The system of claim 1, wherein the vehicle is configured with an electrically-powered powertrain.

8. A system for a vehicle, the system comprising:
    a pair of front wheel hub assemblies configured with a front air suspension system and a double wishbone front suspension, the front air suspension system comprising a first pair of air springs respectively positioned over the pair of front wheel hub assemblies; and
    a pair of rear wheel hub assemblies configured with a rear air suspension system, the rear air suspension system comprising a second pair of air springs respectively positioned over the pair of rear wheel hub assemblies;
    wherein each of the first and second pairs of air springs is configured for substantially axial compression without any guiding structure extending a length thereof, the substantially axial compression of the first and second pairs of air springs lowering a cabin floor of the vehicle; and
    wherein each respective air spring of the first pair of air springs is directly and pivotably coupled to a frame of the vehicle via a respective upper link, and to an upper wishbone of the double wishbone front suspension via a respective leveling link, the respective upper link coupled to the respective air spring being positioned opposite to the respective leveling link.

9. The system of claim 8, wherein the respective leveling link is configured to maintain the substantially axial compression of the respective air spring.

10. The system of claim 8, wherein the substantially axial compression of each air spring of the first pair of air springs being coupled to pivoting of the double wishbone front suspension.

11. The system of claim 8, further comprising a pair of front drive shafts, the first pair of air springs not being fixedly coupled to the pair of front drive shafts.

12. The system of claim 8, further comprising a rear axle, the second pair of air springs being fixedly coupled to the rear axle.

13. The system of claim 8, wherein the vehicle is an electric vehicle configured with front-wheel drive.

14. A method for an electric heavy-duty vehicle, the method comprising:
    compressing air springs in a suspension system of the electric heavy-duty vehicle responsive to a request to lower a cabin floor of the electric heavy-duty vehicle, the air springs being positioned above respective wheel hub assemblies of the electric heavy-duty vehicle; and
    expanding the air springs responsive to a request to raise the cabin floor;
    wherein two of the air springs are respectively positioned above two front wheel hub assemblies of the electric heavy-duty vehicle, wherein each of the two of the air springs respectively positioned above the two front wheel hub assemblies is directly and pivotably coupled to a frame of the electric heavy-duty vehicle via an upper link, and is further pivotably coupled to a wishbone arm via a leveling link, the wishbone arm connecting the frame of the electric heavy-duty vehicle and the wheel hub assemblies; and
    wherein an angle between a central axis of each respective air spring and a plane of the frame of the electric heavy-duty vehicle does not change substantially during compression and expansion of the respective air spring.

15. The method of claim 14, wherein the electric heavy-duty vehicle comprises a battery pack extending along a chassis of the electric heavy-duty vehicle, a width of the battery pack being substantially equal to a width of the chassis; and
   wherein a width of the cabin floor extends between two rear wheel hub assemblies of the electric heavy-duty vehicle.

16. The method of claim 14, wherein the two of the air springs respectively positioned above the two front wheel hub assemblies are axially guided by the leveling link.

17. The method of claim 16, wherein two of the air springs are respectively positioned above two rear wheel hub assemblies of the electric heavy-duty vehicle; and
   wherein the two of the air springs respectively positioned above the two rear wheel hub assemblies are coupled to a single rear axle of the electric heavy-duty vehicle.

18. The method of claim 14, wherein the air springs in the suspension system are simultaneously compressed based on the request to lower the cabin floor.

19. The method of claim 14, wherein a portion of the air springs are compressed independently from a remaining portion of the air springs based on the request to lower the cabin floor;
   wherein the portion of the air springs is positioned at a first side of the electric heavy-duty vehicle, the first side being one of a front side, a rear side, a left side, and a right side; and
   wherein the remaining portion of the air springs is positioned at a second side of the electric heavy-duty vehicle, the second side being opposite to the first side.

\* \* \* \* \*